United States Patent
Wang et al.

(10) Patent No.: US 8,998,177 B2
(45) Date of Patent: Apr. 7, 2015

(54) HUMIDIFYING AND FRESH-KEEPING DEVICE FOR REFRIGERATOR

(75) Inventors: Yuzhi Wang, Jiangsu (CN); Xianghua Ren, Jiangsu (CN); Hongmei Yu, Jiangsu (CN); Bonggil Jin, Jiangsu (CN)

(73) Assignee: Suzhou Samsung Electronics Co., Ltd. (CN)

( * ) Notice: Subject to any disclaimer, the term of this patent is extended or adjusted under 35 U.S.C. 154(b) by 508 days.

(21) Appl. No.: 13/510,715

(22) PCT Filed: Nov. 18, 2010

(86) PCT No.: PCT/CN2010/078861
§ 371 (c)(1),
(2), (4) Date: May 18, 2012

(87) PCT Pub. No.: WO2011/060722
PCT Pub. Date: May 26, 2011

(65) Prior Publication Data
US 2012/0228786 A1    Sep. 13, 2012

(30) Foreign Application Priority Data

Nov. 18, 2009    (CN) ...................... 2009 2 0255463 U

(51) Int. Cl.
*B01F 3/04*     (2006.01)
*A23B 7/148*    (2006.01)
*F25D 17/04*    (2006.01)

(52) U.S. Cl.
CPC .............. *A23B 7/148* (2013.01); *F25D 17/042* (2013.01); *F25D 2317/0413* (2013.01)

(58) Field of Classification Search
USPC .............. 261/78.2, 81, DIG. 48; 62/331, 382, 62/440; 239/102.2
See application file for complete search history.

(56) References Cited

U.S. PATENT DOCUMENTS 3,469,785 A * 9/1969 Boucher et al. .................... 239/4
4,612,777 A * 9/1986 Noma et al. ..................... 62/247

(Continued)

FOREIGN PATENT DOCUMENTS

CN        2425332 Y      3/2001
CN      201274738 Y      7/2009

(Continued)

OTHER PUBLICATIONS

International Search Report for International application No. PCT/CN2010/078861 mailing date of Feb. 24, 2011 with English translation.

*Primary Examiner* — Charles Bushey
(74) *Attorney, Agent, or Firm* — Cantor Colburn LLP

(57) ABSTRACT

A humidifying and fresh-keeping device for a refrigerator is provided, including a device container and a top cover. The container has a drawer for storing fruits and vegetables, and a containing chamber is disposed at one side of the container. A drawer-type water tank is disposed in the containing chamber, with a water storing box at one end and an ultrasonic humidifying device at the other end. A supply air box is disposed at a wind outlet of the ultrasonic humidifying device, and an atomizing air duct is distributed in the container. An inlet of the atomizing air duct corresponds to an outlet of the supply air box, and outlets of the atomizing air duct are provided in the containertop cover. As a result, the fruits and vegetables preserved in the container have an environment humidity of 90-95%, and can be kept fresh in seven days.

11 Claims, 3 Drawing Sheets

(56) References Cited

U.S. PATENT DOCUMENTS

| | | | |
|---|---|---|---|
| 4,738,806 A * | 4/1988 | Noma et al. | 261/81 |
| 4,807,810 A * | 2/1989 | Ando | 236/44 A |
| 5,417,080 A * | 5/1995 | Bishop | 62/376 |
| 5,645,769 A * | 7/1997 | Tamaru et al. | 261/30 |
| 5,653,919 A * | 8/1997 | White et al. | 261/21 |
| 6,726,186 B2 * | 4/2004 | Gaaloul et al. | 261/81 |
| 7,686,285 B2 * | 3/2010 | Murray et al. | 261/81 |
| 7,966,842 B2 * | 6/2011 | Kamisako et al. | 62/373 |
| 2010/0024462 A1 * | 2/2010 | Kamisako et al. | 62/331 |
| 2010/0243767 A1 * | 9/2010 | Mori et al. | 239/691 |
| 2011/0233289 A1 * | 9/2011 | Bortoletto et al. | 236/44 A |

FOREIGN PATENT DOCUMENTS

| | | |
|---|---|---|
| CN | 201425403 Y | 3/2010 |
| CN | 201540004 U | 8/2010 |
| JP | 7-71865 A | 3/1995 |
| JP | 2008-89282 A | 4/2008 |

* cited by examiner

HUMIDIFYING AND FRESH-KEEPING DEVICE FOR REFRIGERATOR

The present application is the national phase of the International Application No. PCT/CN2010/078861 titled "HUMIDIFYING AND REFRESHING DEVICE FOR REFRIGERATOR AND REFRIGERATOR WITH THE SAME" and filed on Nov. 18, 2010, which claims the benefit of priority to the Chinese patent application No. 200920255463.7 titled "HUMIDIFYING AND FRESH-KEEPING DEVICE FOR REFRIGERATOR", filed with the Chinese State Intellectual Property Office on Nov. 18, 2009. The entire disclosure thereof is incorporated herein by reference.

FIELD OF THE INVENTION

The present application relates to a fresh-keeping device, and in particular to a humidifying and fresh-keeping device for a refrigerator and a refrigerator having the humidifying and fresh-keeping device, which belongs to the technical field of household electrical appliances.

BACKGROUND OF THE INVENTION

Based on the important factors of influencing the freshness of vegetables and the research results of the American ASHRAE on vegetable preservation conditions, it is well known that 90% of vegetables need to be in fresh-keeping conditions of a temperature ranging from 0° C. to 10° C. and a humidity ranging from 85% to 95%. Currently, the temperature of the fruit and vegetable refrigerating chamber of the existing refrigerators in the market satisfies the temperature requirement of keeping vegetables fresh. However, the humidity of the fruit and vegetable refrigerating chamber is about 50% and does not meet the humidity requirement, which severely affects the preservation quality of foods, such as vegetables, and causes a relatively short fresh-keeping period of the vegetables in the refrigerator because of losing moisture rapidly. Particularly, the green leafy vegetables will wither and won't be edible after seven days. Although some refrigerators are equipped with a fresh-keeping container to store vegetables for preventing the moisture loss, the fresh-keeping container only functions to slow down the moisture loss in practical, that is, cannot avoid the actual moisture loss of the green leafy vegetables and cannot perform the humidifying function. As a result, after the preservation period of seven days, the problems of withering and being not edible still exist, and thus the long-term preservation cannot be realized.

SUMMARY OF THE INVENTION

An object of the present application is to provide a humidifying and fresh-keeping device for a refrigerator and a refrigerator having the humidifying and fresh-keeping device in order to overcome the above problems in the prior art.

The present application provides the following technical solutions. A humidifying and fresh-keeping device for a refrigerator includes a device container and a top cover. A drawer for storing fruits and vegetables is provided inside the device container. A containing chamber is provided at one side of the device container, and a drawer-type water tank is provided in the containing chamber. A water storing box is mounted at one end of the drawer-type water tank, and an ultrasonic humidifying device is mounted at the other end of the drawer-type water tank. A supply air box having an outlet is provided at a wind outlet of the ultrasonic humidifying device. An atomizing air duct is distributed in the device container, and an inlet of the atomizing air duct corresponds to the outlet of the supply air box. Outlets of the atomizing air duct are provided in the device container.

Further, in the above humidifying and fresh-keeping device for the refrigerator, the ultrasonic humidifying device on the drawer-type water tank is of an integrated structure which is detachable for cleaning. A door seal is provided between a door and a main body of the device container.

Further, in the above humidifying and fresh-keeping device for the refrigerator, the ultrasonic humidifying device includes an ultrasonic atomizer. A water inlet of the ultrasonic atomizer is connected to the water tank. A fan is provided in the supply air box, and an atomizing outlet of the ultrasonic atomizer is connected to an airflow input terminal of the fan.

Further, in the above humidifying and fresh-keeping device for the refrigerator, a water lever sensor is provided inside the water storing box and is connected to a monitoring part of a control circuit, and a control part of the control circuit is connected to the ultrasonic atomizer.

Further, in the above humidifying and fresh-keeping device for the refrigerator, the outlets of the atomizing air duct are uniformly distributed at an upper portion of the side surface of the device container or an inner wall of the top cover, and atomizing moisture flow of the ultrasonic humidifying device is uniformly distributed at a top portion or an upper portion of the device container. In the case that the outlets of the atomizing air duct are distributed at the upper portion of the side surface of the device container, there is a clearance between the outlets of the atomizing air duct and the top cover.

Further, in the above humidifying and fresh-keeping device for the refrigerator, a breathing window is provided on the top cover. An adjusting slide cover, or a polymer film or a microporous cover is provided on an inner side of a frame of the breathing window.

Another object of the present application is to provide a refrigerator including the above humidifying and fresh-keeping device.

One technical solution for realizing the above object is to directly place a humidifying and fresh-keeping device, which has a shape and size matched with a corresponding spatial shape and size of a refrigerating chamber or a fruit and vegetable chamber of the refrigerator, at a corresponding location of the refrigerating chamber or the fruit and vegetable chamber of the refrigerator according to the requirements of customers on the humidifying and fresh-keeping capacity of the refrigerator. Any refrigerators or freezers having the refrigerating function may be employed, such as a side-by-side combination refrigerator, a multi-door refrigerator. The humidifying and fresh-keeping device is mounted inside the refrigerating chamber or the fruit and vegetable chamber, and the humidifying and fresh-keeping device and a refrigerator inner liner are assembled by brackets and guide rails. Cooling circulation wind in the refrigerator does not enter into the device container, but flows around the device container.

Another technical solution for realizing the above object is to modify a part of or the whole of a refrigerating chamber or a fruit and vegetable chamber of the refrigerator into a structure of the above humidifying and fresh-keeping device. Cooling circulation wind in the refrigerator does not enter into the device container, but flows around the device container. As such, a part of or the whole of a refrigerating chamber or a fruit and vegetable chamber of a refrigerator may be formed as the structure of the above humidifying and fresh-keeping device according to the requirements of customers on the humidifying and fresh-keeping capacity of the refrigerator.

For example, the whole of a refrigerating chamber or a fruit and vegetable chamber of a refrigerator may be formed as the structure of the above humidifying and fresh-keeping device, and the drawer may be formed integrally with a door of the refrigerating chamber or the fruit and vegetable chamber of the refrigerator, that is, the door of the humidifying and fresh-keeping drawer is the same as the door of the refrigerating chamber or the fruit and vegetable chamber of the refrigerator. In addition, the drawer may also be formed separately from the refrigerator and the door of the refrigerating chamber or the fruit and vegetable chamber of the refrigerator. In addition, a part of a refrigerating chamber or a fruit and vegetable chamber of a refrigerator may be formed as the structure of the above humidifying and fresh-keeping device to form a humidifying and fresh-keeping area.

By the combination of the ultrasonic humidifying device, the fan and the air duct in the technical solution of the present application, the fruits and vegetables stored in the device container may have an environment humidity ranging from 90% to 95%, and may hardly lose moisture and may retain fresh after seven days. The water tank and the water storing box used may be assembled and disassembled integrally or independently. Further, the water tank may also be disassembled together with assemblies such as the ultrasonic atomizer from the humidifying and fresh-keeping device, which facilitates the disassembling and the cleaning and avoids the secondary pollution. The above design may be applied in the existing side-by-side combination refrigerator or the multi-door refrigerator by mounting the humidifying and fresh-keeping device at the position of the original refrigerating chamber or the original fruit and vegetable chamber so as to be a "fresh-keeping chamber" of the refrigerator.

The objects, advantages and features of the present application will be illustrated and explained by the following non-restrictive description of preferred embodiments, and these embodiments referring to the drawings are only provided as examples.

Figure 1:
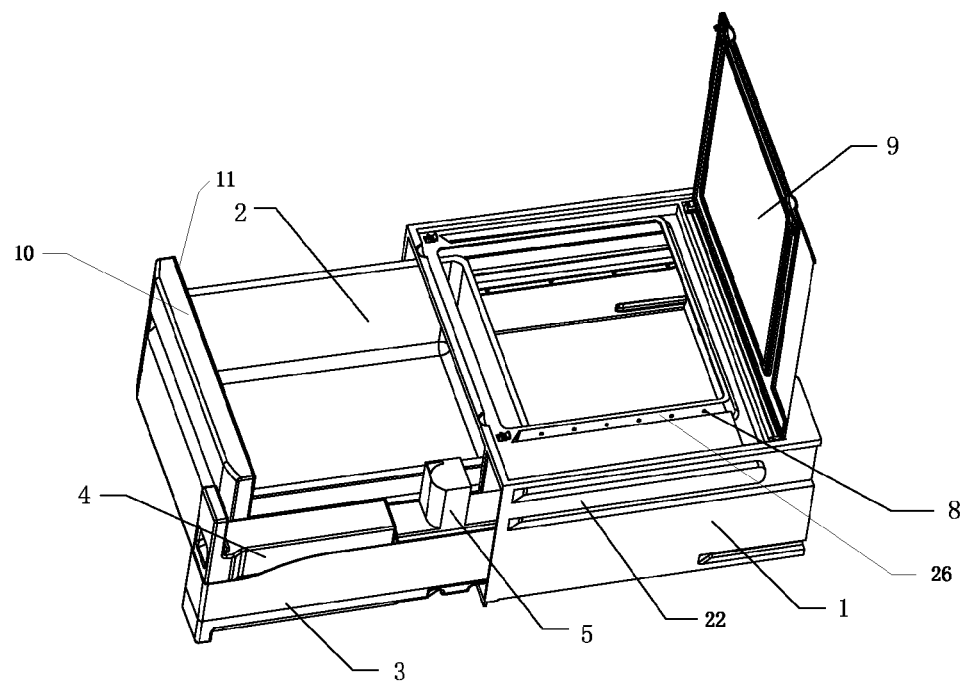
FIG. 1 is a schematic view of a construction of a humidifying and fresh-keeping device for a refrigerator.

Reference numerals in the drawings are listed as follow:

| | |
|---|---|
| 1 device container; | 2 storage drawer; |
| 3 drawer-type water tank; | 4 water storing box; |
| 5 supply air box; | 6 ultrasonic humidifying device; |
| 7 fan; | 8 outlet of atomizing air duct; |
| 9 top cover; | 10 device container door; |
| 11 door seal of device container; | 12 wind outlet of refrigerating chamber; |
| 13 wind return opening of | 22 inner liner bracket; |

-continued

Reference numerals in the drawings are listed as follow:

| | |
|---|---|
| refrigerating chamber; | |
| 26 atomizing air duct; | 27 water level sensor; |
| 28 breathing window; | 32 cooling air duct; |
| 34 refrigerating chamber. | |

DETAILED DESCRIPTION OF THE EMBODIMENTS

Figure 2:
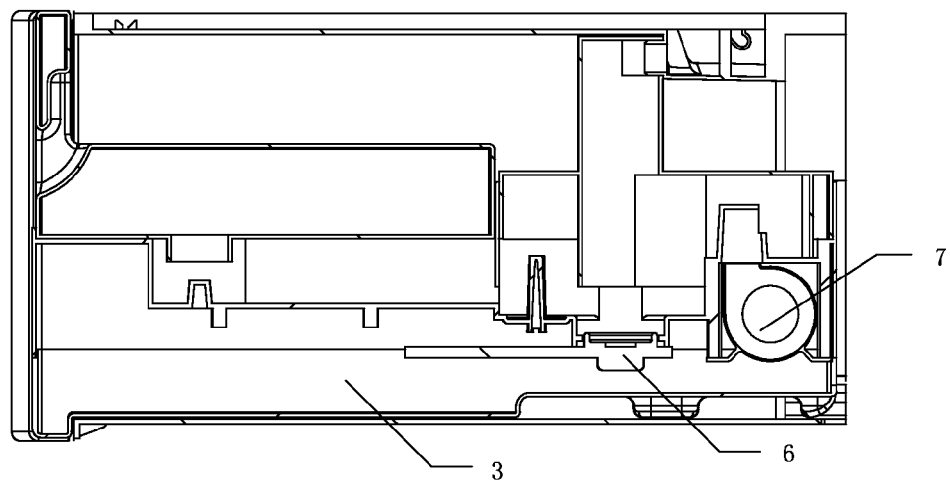
FIG. 2 is a sectional schematic view of a construction of a humidifying and fresh-keeping device for a refrigerator.
Figure 3:
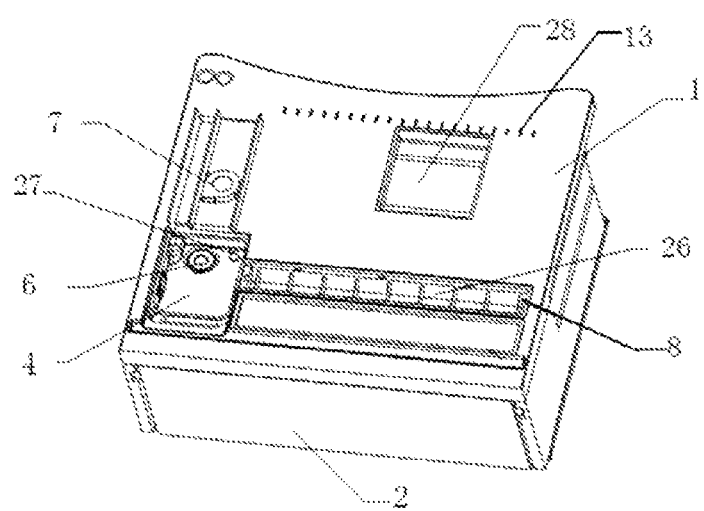
FIG. 3 is a perspective view of a humidifying and fresh-keeping device for a refrigerator having a breathing window, viewing from a top cover thereof.

As shown in FIGS. 1 to 3, the present application provides a humidifying and fresh-keeping device for a refrigerator, including a device container 1 and a top cover 9. A storage drawer 2 for storing fruits and vegetables is provided inside the device container 1. The storage drawer 2 may be transformed into a detachable container according to specific applications. Further, a containing chamber is provided at one side of the device container 1, and is provided therein with a drawer-type water tank 3. A water storing box 4 is mounted at one end of the drawer-type water tank 3, and an ultrasonic humidifying device 6 is mounted at the other end of the drawer-type water tank 3. A wind outlet of the ultrasonic humidifying device 6 is provided with a supply air box 5. An atomizing air duct 26 is distributed in the device container 1. A wind inlet of the atomizing air duct 26 corresponds to a wind outlet of the supply air box 5, and outlets 8 of the atomizing air duct 26 are provided in the device container 1.

In the technical solution of the present application, the ultrasonic humidifying device 6 may be of an integrated structure which is detachable for cleaning, and includes an ultrasonic atomizer. A water inlet of the ultrasonic atomizer is connected to the drawer-type water tank 3. A fan 7 is provided in the supply air box 5, and particularly may be a centrifugal fan. An atomizing outlet of the ultrasonic atomizer is connected to an airflow input terminal of the fan 7. Therefore, with the starting of the fan 7, atomizing moisture produced by the ultrasonic atomizer may be led into the storage drawer 2 through the atomizing air duct 26. Further, in order to effectively control the ultrasonic atomizer assembly, a control device is connected to control parts of the ultrasonic humidifying device 6 and the fan 7. In this way, the operation of the ultrasonic atomizer assembly may be effectively controlled by the control device, so as to moisturize fruits and vegetables. In addition, in order to detect the water lever of the ultrasonic atomizer and ensure that the amount of the atomizing moisture satisfies the moisturizing preservation requirements of fruits and vegetables, a water lever sensor 27 is provided inside the water storing box 4 and is connected to a monitoring part of a control circuit, and a control part of the control circuit is connected to the ultrasonic atomizer.

In order that there is a perfect humidifying and fresh-keeping covering area in an inner containing space of the device container 1, the outlets 8 of the atomizing air duct may be provided at an upper portion of a side wall of the device container 1, or at the periphery or central position of an inner wall of the top cover 9. In the case that the top cover 9 is of an openable structure, the outlets 8 of the atomizing air duct may be uniformly distributed on one or more side surfaces of the device container 1, so that the top cover 9 may be conveniently opened to perform daily cleaning of the outlets 8 of the atomizing air duct. In the case that the top cover 9 is fixed on the device container 1, the atomizing air duct 26 may be configured to be of a detachable structure, and the outlets 8 of the atomizing air duct are uniformly distributed on the periphery or central position of the inner wall of the top cover 9, thereby facilitating the cleaning of the air duct. With the above design, atomizing moisture flow formed by the ultrasonic humidifying device 6 may uniformly distributed at a top portion of a side surface of the inner space of the device container 1 or at an inner side of the top cover. Thus, the atomizing moisture flow would not directly contact a part of the vegetables for a long time so as to prevent vegetables from rot.

In addition, considering the fresh-keeping and breathing requirements of the fruits and vegetables, the humidifying and fresh-keeping device for the refrigerator according to the present application may be further provided with a breathing window 28 on the top cover 9, and an adjusting slide cover or a polymer film or a microporous cover may be provided on an inner side of a frame of the breathing window. Specifically, in order to prevent other storage spaces in the refrigerator from being affected by the atomizing moisture, the polymer film such as a silicone rubber film may be used as a blocking medium of the breathing window 28 to prevent the atomizing moisture from spreading to the outside and to allow the exchange of the inside and outside air, thereby adjusting atmosphere containing oxygen and carbon dioxide and so on, and maintaining the atmosphere with a reasonable proportion of components and a reasonable humidity inside the storage drawer 2, as shown in FIG. 3.

In actual application, the ultrasonic atomizer produces the atomizing moisture, and the airflow produced by the centrifugal fan 7 brings the atomizing moisture into the atomizing air duct 26 of the device container 1 via the supply air box 5. Then, the atomizing moisture enters into the storage drawer 2 through the atomizing air duct outlets 8 to uniformly moisturize the fruits and vegetables stored inside the storage drawer 2. Due to a door seal 11 mounted on the device container door 10, as shown in FIG. 1, the moisture inside the container cannot leak out easily, and the humidity inside the storage drawer 2 is maintained within the range of 90% to 95%. When a user wants to clean the water storing box 4 or to refill with water, the user only needs to pull and open the drawer-type water tank 3, and then take out the water storing box 4. When the user wants to clean the drawer-type water tank 3, the user only needs to take out the water storing box 4 so as to clean the drawer-type water tank 3.

The humidifying and fresh-keeping device provided by the present application may be adapted to various kinds of existing refrigerators well. Particularly, the humidifying and fresh-keeping device may be assembled by brackets and guide rails. As shown in FIG. 1, inner liner bracket 22 are provided on the outer side of the device container 1, and guide rails are provided at corresponding positions on a refrigerator inner liner. Alternatively, inner liner guide rails are provided on the outer side of the device container 1, and brackets are provided at corresponding positions on the refrigerator inner liner. In this way, the humidifying and fresh-keeping device may be embedded in the refrigerator inner liner well, and the assembling and the disassembling are both convenient.

Figure 4:
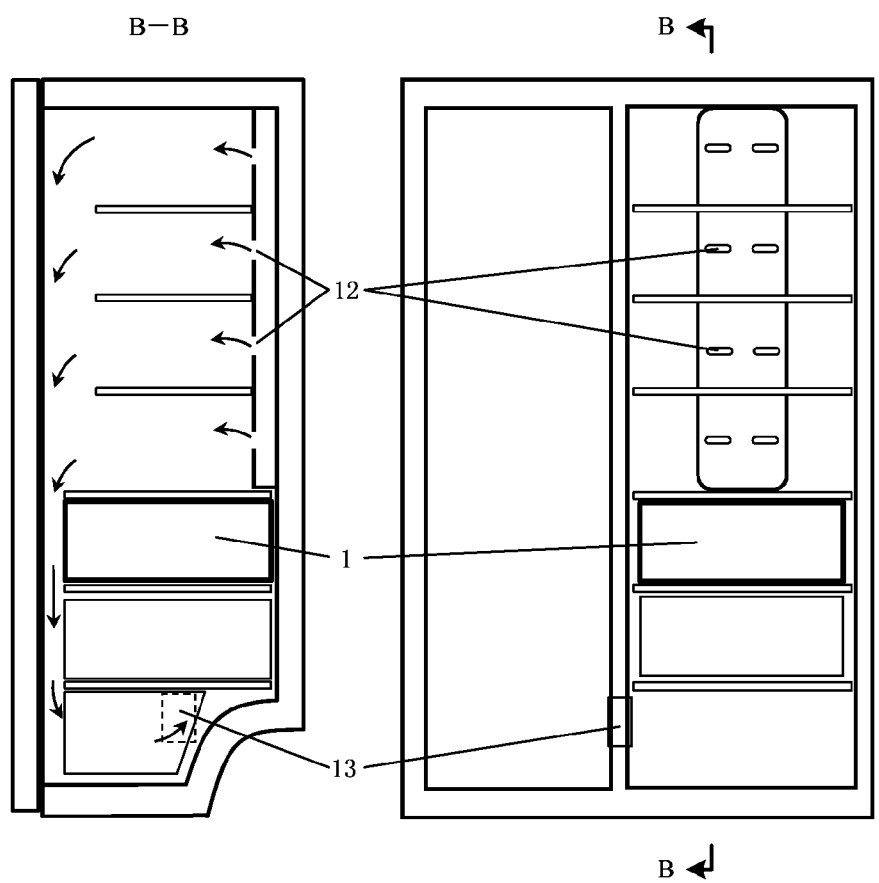
FIG. 4 is a schematic view of a humidifying and fresh-keeping device provided in a refrigerating chamber of a side-by-side combination refrigerator.
Figure 5:
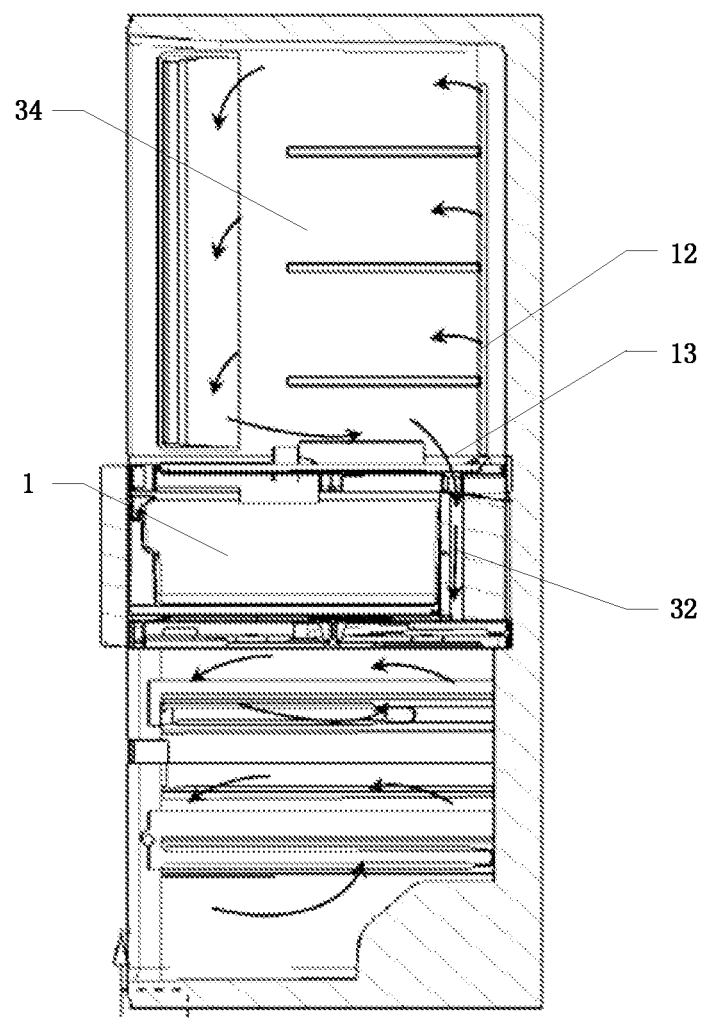
FIG. 5 is a schematic view of a multi-door refrigerator in which a fruit and vegetable chamber is improved as a humidifying and fresh-keeping chamber.

In the case of an existing side-by-side combination refrigerator, the humidifying and fresh-keeping device may be provided at a position of an original refrigerating chamber, such that cooling circulation wind in the refrigerating chamber of the refrigerator flows around the humidifying and fresh-keeping device, thereby cooling the humidifying and fresh-keeping device. Particularly, as shown in FIG. 4, cold wind of the refrigerator comes from wind outlets 12 of the refrigerating chamber and flows through a front portion of the device container 1 of the humidifying and fresh-keeping device, and then flows downwardly back into wind return openings 13 of the refrigerating chamber. The top cover 9, the outer side of the device container door 10 and a bottom portion of the container of the humidifying and fresh-keeping device are cooled by the external circulation wind, so that the temperature inside the fresh-keeping box may satisfy the fresh-keeping requirements. In the case of an existing multi-door refrigerator, the humidifying and fresh-keeping device may be provided at a position of an original fruit and vegetable chamber. As shown in FIG. 5, the cooling circulation wind comes from the refrigerating chamber wind outlets 12 of the refrigerating chamber 34 and cools all compartments of the refrigerating chamber, and then flows through a cooling air duct 32 of the original fruit and vegetable chamber via the wind return openings 13 of the refrigerating chamber so as to cool all around the device container 1.

Under the above two situations, the cooling circulation wind of the refrigerator would not enter into the humidifying and fresh-keeping container, and the atomizing air duct 26 inside the device container is completely isolated from the external cooling air duct 32, so that the atomizing moisture only exists in the fruit and vegetable fresh-keeping chamber. Therefore, the processes of "cooling" and "atomizing" are mutually independent and cooperate, so as to ensure that the temperature and the humidity of the fruits and vegetables stored in the storage drawer 2 both meet the fresh-keeping requirements.

It can be known from the above description and in conjunction with the drawings that, the present application may retain the fruits and vegetables still fresh after seven days nearly without moisture loss based on humidity, atmosphere, temperature and so on by the combination of the ultrasonic atomizer assembly and the breathing window assembly. Further, the drawer-type water tank and the water storing box used are mutually independent, which facilitates the disassembling and the cleaning and avoids the secondary pollution. Certainly, the above embodiments are only specific application examples of the present application, and do not limit the protection scope of the present application. Besides the above embodiments, the present application may have other embodiments. Any technical solutions formed by equivalent replacements or equivalent transformations are also deemed to fall into the protection scope of the present application.

What is claimed is:

1. A humidifying and fresh-keeping device for a refrigerator comprising a device container and a top cover, wherein a drawer for storing fruits and vegetables is provided inside the device container, a containing chamber is provided at one side of the device container, a drawer-type water tank is provided in the containing chamber, a water storing box is mounted at one end of the drawer-type water tank, an ultrasonic humidifying device is mounted at the other end of the drawer-type water tank; a supply air box having an outlet is provided at a wind outlet of the ultrasonic humidifying device; an atomizing air duct is distributed in the device container, an inlet of the atomizing air duct corresponds to the outlet of the supply air box, and outlets of the atomizing air duct are provided in the device container.

2. The humidifying and fresh-keeping device for the refrigerator according to claim 1, wherein the ultrasonic humidifying device on the drawer-type water tank is of an integrated structure which is detachable for cleaning.

3. The humidifying and fresh-keeping device for the refrigerator according to claim 1, wherein a door seal is provided between a door and a main body of the device container.

4. The humidifying and fresh-keeping device for the refrigerator according to claim 1, wherein the ultrasonic humidifying device comprises an ultrasonic atomizer, a water inlet of the ultrasonic atomizer is connected to the water tank; a fan is provided in the supply air box, and an atomizing outlet of the ultrasonic atomizer is connected to an airflow input terminal of the fan.

5. The humidifying and fresh-keeping device for the refrigerator according to claim 4, wherein a water lever sensor is provided inside the water storing box and is connected to a monitoring part of a control circuit, and a control part of the control circuit is connected to the ultrasonic atomizer.

6. The humidifying and fresh-keeping device for the refrigerator according to claim 1, wherein the outlets of the atomizing air duct are uniformly distributed at an upper portion of a side surface of the device container or an inner wall of the top cover, and atomizing moisture flow of the ultrasonic humidifying device is uniformly distributed at a top portion or an upper portion of the device container.

7. The humidifying and fresh-keeping device for the refrigerator according to claim 6, wherein the outlets of the atomizing air duct are distributed at the upper portion of the side surface of the device container, and there is a clearance between the outlets of the atomizing air duct and the top cover.

8. The humidifying and fresh-keeping device for the refrigerator according to claim 1, wherein a breathing window is provided on the top cover, and wherein an adjusting slide cover or a polymer film or a microporous cover is provided on an inner side of a frame of the breathing window.

9. A refrigerator comprising the humidifying and fresh-keeping device for the refrigerator according to claim 1, wherein cooling circulation wind flows around the container of the humidifying and fresh-keeping device and does not enter into the container.

10. The refrigerator according to claim 9 comprising a refrigerating chamber and a fruit and vegetable chamber, wherein the humidifying and fresh-keeping device is mounted in whole in the refrigerating chamber or the fruit and vegetable chamber directly, and wherein the humidifying and fresh-keeping device and a refrigerator inner liner are assembled by brackets and guide rails.

11. A refrigerator comprising a refrigerating chamber and a fruit and vegetable chamber, wherein the refrigerating chamber or the fruit and vegetable chamber of the refrigerator is modified partially or in whole into a structure of the humidifying and fresh-keeping device for the refrigerator according to claim 1.

* * * * *